United States Patent
Sanchelima

[19]

[11] Patent Number: 5,901,740
[45] Date of Patent: May 11, 1999

[54] CONTINUOUS EXTENDED HOLDING TANK WITH VARIABLE RESIDENT TIME

[76] Inventor: Juan Andres Sanchelima, Miami, Fla.

[21] Appl. No.: 08/961,678

[22] Filed: Oct. 31, 1997

[51] Int. Cl.⁶ .............................. F16K 31/02; G05D 9/12
[52] U.S. Cl. ...................... 137/392; 137/592; 137/594; 137/558; 99/453; 99/483; 222/64; 220/501; 220/560.03; 340/620; 73/304 R; 73/313
[58] Field of Search ..................................... 137/392, 558, 137/592, 574; 220/501, 571, 560.03; 222/185.1, 64; 340/620; 73/304 R, 313; 99/453, 468, 483; 141/198

[56] References Cited

U.S. PATENT DOCUMENTS

| | | | |
|---|---|---|---|
| 2,385,161 | 12/1945 | Pinkerton | 137/392 |
| 3,882,967 | 5/1975 | Gulla et al. | 137/392 |
| 5,467,890 | 11/1995 | Hussey | 220/571 |
| 5,474,788 | 12/1995 | Lynch | 220/501 |
| 5,771,917 | 6/1998 | Carney et al. | 137/392 |

FOREIGN PATENT DOCUMENTS

| | | | |
|---|---|---|---|
| 343889 | 11/1921 | Germany . | |
| 404102600 | 3/1992 | Japan | 137/392 |
| 874666 | 10/1981 | U.S.S.R. | 137/392 |

*Primary Examiner*—George L. Walton
*Assistant Examiner*—Bryan C. Wallace
*Attorney, Agent, or Firm*—J. Sanchelima

[57] ABSTRACT

A tank for holding a liquid for a predetermined and relatively long time in a continuous flow process. The tank includes an inner compartment with an inlet and an outer compartment with an outlet. The outer compartment encloses the inner compartment except its inlet. The liquid enters through the inlet and is forced upwardly in a non-preferential flow, it overflows to the outer compartment and comes out through the outlet. A pump is connected to the outlet and a variable throttle valve is in turn connected to the output of the pump. A level sensor for the liquid is connected to a computerized control unit to monitor the liquid level and to activate the throttle valve to either restrict or increase the flow to adjust the liquid level. Since the flow rate then is brought back to what it was when throttle valve is restricted to its original state, then changing the liquid level in the second compartment is equivalent to changing the holding time.

9 Claims, 1 Drawing Sheet

CONTINUOUS EXTENDED HOLDING TANK WITH VARIABLE RESIDENT TIME

II. BACKGROUND OF THE INVENTION

1. Field of the Invention

The present invention relates to a holding tank, and more particularly, to the type that is used in continuous flow processing of milk.

2. Description of the Related Art

The processing of liquids, and in particular milk, requires inter alia exposure to predetermined temperatures over a given time period. For pasteurizing milk in a modern continues flow process the milk is typically exposed to a relatively high temperature (72° to 75° C.) for a relatively short time (16 seconds). And this is referred to as the HTST (High Temperature Short Time) method.

Another method for pasteurizing milk is known as the LTH (Low Temperature Long Time) method wherein the milk is held for 30 minutes at a relatively lower temperature of 63–65° C. Both processes have their advantages and disadvantages.

The longer holding time of the latter method, however, makes it impractical for use in continuos flow processes since it would require an extraordinarily long conduit. Thus, the desirability of having a device that can provide a variable holding time in a continuous flow environment. Furthermore, it is also desirable that this device be capable of readily changing the holding time as required or desired. The present invention provides the user with this flexibility permitting the immediate adjustment of holding times to achieve the projected output characteristics.

The closest reference known to applicant corresponds to German patent No. 343,889 issued in 1921. Basically, the heating unit of the foreign patentee utilizes chambers with smaller diameters (for faster flow) where the milk rises to prevent the heavier solids from separating. The only concern in that patented invention was to mechanically prevent the settlement of the heavier particles. In the present invention there is no preferential flow and the milk follows the first in, first out rule. More important, the foreign patent does not disclose level sensors or any other mechanisms for changing the holding time.

III. SUMMARY OF THE INVENTION

It is one of the main objects of the present invention to provide a holding tank that permits holding a liquid for a selectable predetermined time period at a given temperature.

It is another object of this invention to provide a holding tank with an inlet and an outlet to be used in a continuous flow process that ensures the non-preferential flow of the milk being held as it progress up an inner compartment and spilling over a horizontal rim to an outer compartment.

It is still another object of the present invention to provide a holding tank with capabilities for readily varying the resident time for the liquid passing through it.

It is yet another object of this invention to provide a holding tank that is relatively inexpensive to manufacture and maintain while retaining its effectiveness.

It is another object of this invention to provide a process for varying the amounts of holding time in a continuous flow process of milk.

It is another object of this invention to provide a process that includes the capability of varying the holding time and maximizing the yield of precipitating whey proteins at higher than conventional pasteurization temperature.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE PREFERRED EMBODIMENT

Figure 1:
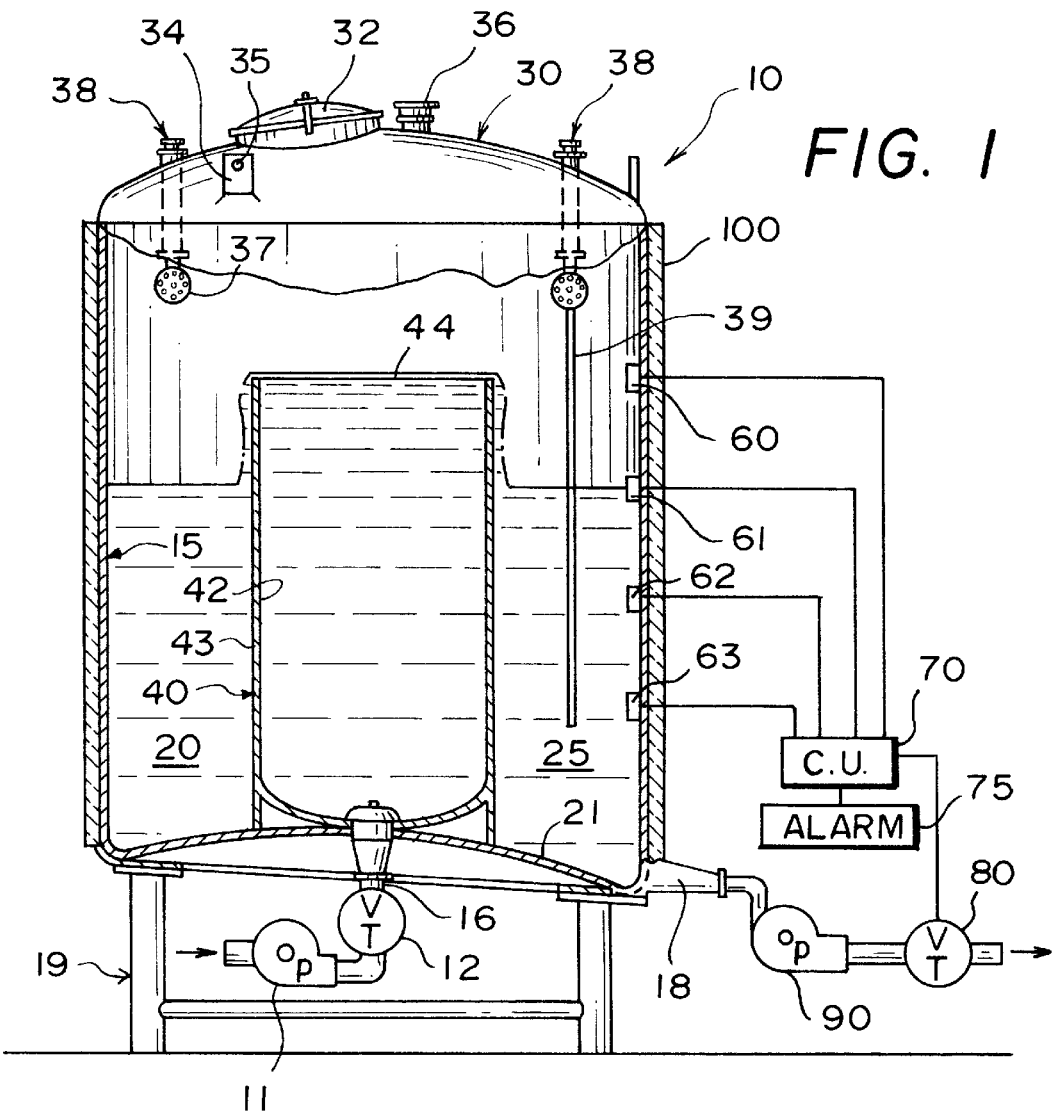
FIG. 1 represents an elevational front view of the present invention and a partial cross section of the tank compartments.
Figure 2:
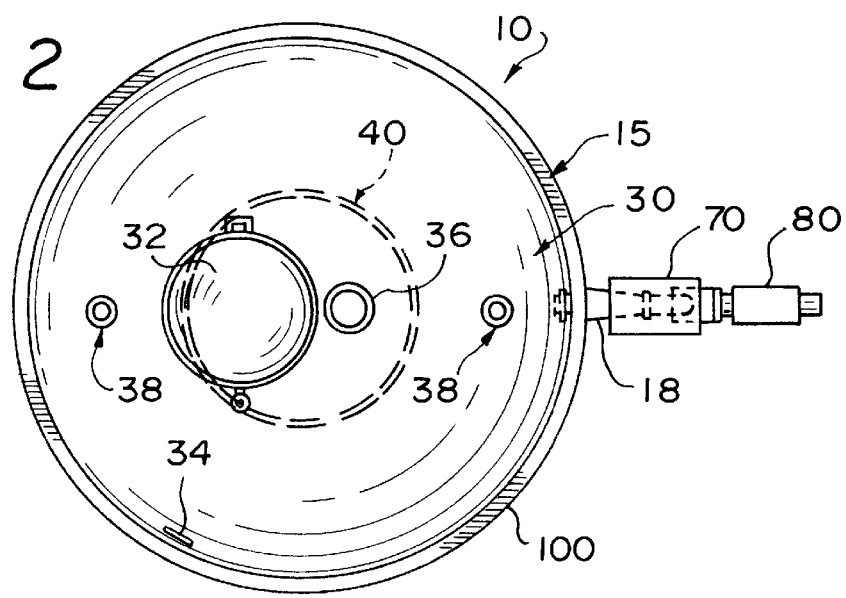
FIG. 2 shows a top view of the present invention.

Referring now to the drawings, where the present invention is generally referred to with numeral 10, it can be observed that it basically includes insulated holding tank assembly 15 with inner compartment 40 inside of outer compartment 20, cover assembly 30 and support assembly 19. Outer compartment 20 is maintained vertically and includes a slightly inclined bottom 21 that facilitates drainage of the liquid contained therein.

In one of the contemplated applications of the invention, the liquid is milk. The milk, in one of the applications contemplated by the inventor needs to be kept at a temperature between 80 and 90 degrees centigrade for a period of time that could be between 7 and 35 minutes, in order to provoke the denaturation of the milk serum or whey proteins. It has been found that in making cheese the production yield is increased if the otherwise soluble whey proteins are caused to lose their solubility (denature) and allowed to join to the casein curd.

In operation, the liquid enters inner tank 40 through inlet 16 reaching the top horizontal rim of inner compartment 40 under a predetermined relatively low flow rate that avoids turbulence. The liquid travels upwardly, uniformly. When it reaches the top, the liquid overflows by the open end defined by horizontal rim 44 to outer compartment 20. The liquid then starts traveling downwardly in a laminar flow over external lateral surface 43 and is deposited in annular space 25. The liquid is continuously poured over the liquid that had preceded it so that the first liquid through inlet 16 in is the first liquid out through outlet 18, thereby keeping its preferential position and ensuring being held within holding tank 15 a selectable predetermined amount of time. Initially, outlet 18 is kept closed until enough liquid has accumulated to achieve the desired level for the outer compartment. Valve 12 is preceded by pump 11 and both regulate the flow of the milk. Level sensors 60; 61; 62 and 63 are connected to control unit 70. Sensors 60; 61; 62 and 63 provide a signal to control unit 70 depending on whether or not the level of the liquid has reached a predetermined level where the particular sensor is located. Sensors 60; 61; 62 and 63 can be replaced with a level sensor that could be telescopically inserted inside compartment 20, or by any other equivalent means to sense the level of the liquid, such as pressure sensors that determine the level of the liquid by sensing pressure at a given position inside the body of milk. Sensors 60; 61 and 62, in the preferred embodiment, provide an output to control unit 70, which may be implemented into a general purpose micro-processor with memory for storing data and instructions. Control unit 70 is connected to sensors 60; 61 and 62 and controls variable throttle valve 80. Valve 80, in the preferred embodiment, is pneumatically activated but other types of valves, such as electrical ones, can also be used. Valve 80 is preceded by pump 90, which in the preferred embodiment can be implemented with a sanitary centrifugal pump. If a user wants to increase the holding time, control unit 70 can be programmed to close valve 80 more until the level reaches sensor 61, and them adjust to the original flow rate. And vice versa, if the holding time is to be reduced, the level may be brought to that of sensor 63. In this manner, the levels for the liquid inside outer compartment 20 will establish the pre-determined resident time for the liquid. Alarm assembly 75 is disposed for displaying audio, visual, or both, signals to alert a user that a predetermined level has been reached. The temperature inside compartment 20 is preferably kept constant through the use of thermic insulator 100.

Cover assembly 30 has, in the preferred embodiment, manhole 32, air inlet 36, tab 34, washing assembly 38 and temperature probe 39. Manhole 32 permits easy access inside compartment 20. Tab 34 includes opening 35 to facilitate the lifting of cover assembly 30. Air inlet and outlet 36 is designed to keep a low pressure on the liquid in order to push it out through outlet 18 without any deformation to the internal surfaces of the both compartments 20 and 40, and to keep a constant pressure during the process. Washing assembly 38 includes nozzle 37 with a plurality of holes to direct water (or the cleaning liquids) in different directions when the tank is being cleaned. Temperature probe assembly 39 extends downwardly a sufficient distance to ensure that it comes in contact with the liquid for all the levels to be used.

Holding tank 10 works in the following manner. The liquid, typically milk, to be pasteurized, comes through inlet 16 and dispersed. The liquid is pushed upwardly displacing the liquid that preceded it until it overflows inner compartment 40. The liquid comes down pushing the liquid that had preceded it until it is pushed out through outlet 18. This movement of the liquid is aided by pump 90, and if desired, a slight pressure introduced through air inlet and outlet 36. It is important to note that the liquid, as it travels through holding tank 10, it is forced to reside, and consequently maintain a predetermined temperature, for a predetermined amount of time. This amount of time (as well as the temperature) can be varied by the user. The amount of time the liquid stays or resides inside holding tank 10 will be determined by the level at which the device is chosen to operate. For instance, if the device is programmed to operate so that sensor 63 is to control valve 80, then the resident time of the liquid will be smaller than if sensor 62 is selected. This is so because the liquid has to travel (and push the preceding liquid) over a longer path (determined by the level of the liquid). The minimum resident time will consequently be determined, inter alia, by the height dimensions (assuming a constant liquid flow rate through inlet 16) of inner compartment 40, and it can be adjusted by selecting one of the sensors 60 through 63 located at different levels, or through the use of any other level sensors.

In the preferred embodiment, it has been found that a holding tank 16 having inner compartment 40 with a substantially cylindrical shape (30 inches in diameter, 54 and ¾ inches in height plus a concave bottom with maximum height of 6 inches) with capacity of 662 liters and outer compartment 20 also having a substantially cylindrical shape (72 inches diameter, 83 and ½ inches height with convex bottom surface having 19 and 3/16 inches height) works well at 132.4 liters per second.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tank assembly for holding a liquid for predetermined time in a continuous flow, comprising:
   A) first compartment means for holding said liquid housed within said tank assembly and extending vertically therein with an upper end having an opening defining a horizontal rim, and further including a lower end having an inlet for said liquid;
   B) second compartment means completely housing said first compartment means except for said inlet, and said second compartment means having a bottom with an outlet for discharging said liquid overflowing said rim with a non-preferential flow;
   C) means for maintaining a flow of said liquid entering said inlet and exiting said outlet so that said liquid is held over a predetermined amount of time within said first and second cylindrical compartment means; and
   D) means for sensing the level of the liquid inside said second compartment and being connected to said means for maintaining a flow so that the liquid level in said second compartment and, thus said predetermined amount of time, is thereby selectively adjusted by a controlling means.

2. The tank set forth in claim 1 further including:
   D) valve means for controlling the flow of said liquid through said outlet.

3. The tank set forth in claim 2 further including:
   E) programmable means for controlling said valve means and having input means connected to said plurality of sensing means so that the level of said liquid within said second compartment means is adjustable thereby also making the holding time adjustable.

4. The tank set forth in claim 3 wherein said programmable means includes computer means and memory means for storing data and instructions.

5. The tank set forth in claim 4 wherein said first and second compartment means have a substantially cylindrical shape.

6. The tank set forth in claim 5 wherein said bottom has a convex shape, is slightly slanted and said outlet is positioned in the lowermost portion so that drainage is facilitated.

7. The tank set forth in claim 6 further including:
   F) temperature sensing means for measuring the temperature of said liquid and being connected to said programmed means.

8. The tank set forth in claim 7 further including:
   G) alarm means for displaying audio, visual, or both, signals to alert a user that a predetermined level has been reached.

9. The tank set forth in claim 8 further including:
   H) output means for monitoring the level and temperature of said liquid, said output means being connected to said programmable means.

\* \* \* \* \*